Patented Mar. 5, 1929.

1,704,367

UNITED STATES PATENT OFFICE.

THOMAS C. MOORE, OF FRESNO, CALIFORNIA, ASSIGNOR TO MOR-PAK PRESERVING CORPORATION, OF FRESNO, CALIFORNIA, A CORPORATION OF NEVADA.

PROCESS OF PRESERVING FRUIT.

No Drawing.    Application filed November 1, 1926.  Serial No. 145,455.

This invention relates primarily to a process of preserving figs, but is equally adaptable to other fruit.

Heretofore, in preserving figs, it has required from sixty-five to seventy-five minutes to thoroughly cook and preserve the figs. Considerable loss has been experienced due to the fruit splitting or bursting during the cooking period thereby resulting in deterioration of the product by shrinkage, loss of color, splitting and attractive appearance.

The object of the present invention is to provide a process of preserving figs in which the time required for cooking is reduced to a minimum; the danger of splitting or bursting eliminated; and the fruit permitted to retain its natural color, thereby producing an attractive and palatable fruit, natural in color and plumpness and at the same time increasing the preserving qualities and reducing the cost of production to a minimum.

I accomplish this object by first perforating the figs with a multiplicity of very small perforations which extend entirely through the fruit, thereby providing free and easy access of a syrup solution to the interior of the fruit and, at the same time, permitting escape of excess heat and steam from the fruit, while cooking, thus avoiding the possibility of the fruit being damaged through bursting or splitting. The perforating of the figs also serves another and important function, to wit that of permitting draining off or escape of the milk under the skin which, otherwise, would impart a bitter flavor and would also cause darkening or discoloring of the figs when cooking the same.

In practicing my process, I first take fresh ripe figs and perforate the same in any suitable manner, but preferably by the use of a machine provided by me for that purpose and forming the subject matter of a separate application entitled "Fruit perforating machine", filed Nov. 1, 1926, Ser. No. 145,677. The fruit is then placed in a light lye bath which absorbs the milk and which softens the skin sufficiently to permit it to be freely removed by agitation in boiling water. After the skins have been removed and the figs washed, they are placed in pans of convenient size for handling.

A syrup solution composed of substantially one part corn syrup and two parts cane syrup equal to thirty degrees Brix or Balling, is then poured over the figs until they are covered. The contents of the pans are then subjected to a boiling action from 12 to 15 minutes more or less. The pans are then set aside and the contents permitted to cool. During the cooling operation the figs absorb the syrup solution and thereby causes them to assume their normal plump and natural shape.

The figs are then packed into jars while cold and the syrup in which they were previously boiled is again heated to a temperature of approximately 212° F. and is poured over the figs in the jars to completely cover the same. The jars are then exhausted and capped in the usual manner and are finally subjected to a sterilizing operation from 12 to 30 minutes, depending upon the size of the jars.

By using cane syrup and corn syrup in the proportions specified the figs retain their natural flavor and the excessive sweetness obtained by the ordinary process of treating or preserving figs is avoided.

In the use of the ordinary process, by reason of the fact that the figs are not perforated, the syrup cannot permeate entirely through the figs and a syrup of much greater density is, accordingly, required to preserve the same. By perforating the figs, I am enabled to use a much lighter sugar content, because of the fact that the syrup can permeate entirely through the fruit and by reason of this permeation, the fruit can be stored indefinitely until needed and furthermore can be used for other purposes, such as candied fruits, jams, jellies and the like. On the other hand, by using heavy syrup by the ordinary method, the fruit is rendered unsuitable for other purposes and must be packed immediately. A heavy syrup also causes loss of color and plumpness due to the longer cooking period required and the inability of the fruit to absorb a sufficient quantity of the syrup.

Having thus described my invention, what I claim and desire to secure by Letters Patent is:—

1. The herein described process of preserving figs which consists in perforating the same, placing the figs in a light lye bath to remove the fig milk draining from the figs and to soften the skin of the figs, placing the figs in hot water and agitating the same to remove the skin and to wash the figs, placing the figs in a container and covering the same with a syrup solution, subjecting the figs and the solution to a boiling action and finally permitting the figs and the syrup solution to cool to allow the syrup solution to be absorbed by the figs.

2. The herein described process of preserving figs which consists in perforating the same, placing the figs in a light lye bath to remove the fig milk draining from the figs and to soften and remove the skin of the figs, placing the figs in a container and covering the same with a syrup solution, composed of corn syrup one part and cane syrup two parts with a gravity of approximately thirty degrees Brix or Balling, subjecting the figs and the syrup solution to a boiling action for substantially twelve or fifteen minutes and then permitting the figs and syrup solution to cool so as to allow the syrup to be absorbed by the figs.

3. The herein described process of preserving figs, which consists in perforating the same, placing the figs in a light lye bath to remove the fig milk draining from the figs and to soften and remove the skin of the figs, placing the figs in a container and covering the same with a syrup solution, composed of corn syrup one part and cane syrup two parts with a gravity of approximately thirty degrees Brix or Balling, subjecting the figs and the syrup solution to a boiling action for substantially twelve or fifteen minutes and then permitting the figs and syrup solution to cool so as to allow the syrup to be absorbed by the figs, placing the figs in containers, while cold, heating the syrup solution in which the figs were boiled to a temperature of approximately 212° F. and pouring the solution over the figs, then exhausting and capping the containers and finally subjecting the same to a sterilizing action.

4. In the hereindescribed process of preserving figs that step which consists in perforating the figs prior to placing the figs in a syrup solution and boiling them, said perforation of the figs preventing bursting of the figs during boiling, and, furthermore, permitting the figs to absorb the syrup solution when cooling.

5. In the herein described process of preserving figs the steps which consist first in perforating the figs, and secondly in removing milk draining from the perforated figs.

6. In the herein described process of preserving figs the steps which consist first in perforating the figs, secondly, in placing the figs in a lye bath to remove milk draining from the perforated figs and to soften the skin of the figs, and third, placing the figs in hot water and agitating the same to remove the skin and to wash the figs.

THOMAS C. MOORE.